United States Patent [19]

Darling

[11] Patent Number: 5,105,524
[45] Date of Patent: Apr. 21, 1992

[54] METHOD FOR FLARING PIPE LINERS

[75] Inventor: James R. Darling, Oakville, Canada

[73] Assignee: Du Pont Canada Inc., Mississauga, Canada

[21] Appl. No.: 568,486

[22] Filed: Aug. 16, 1990

Related U.S. Application Data

[62] Division of Ser. No. 346,829, May 2, 1989, Pat. No. 4,968,241.

[51] Int. Cl.⁵ .................. B29C 57/00; B29C 63/64
[52] U.S. Cl. .................. 29/525.1; 264/249; 264/269; 264/294; 264/296; 264/322
[58] Field of Search ............ 264/249, 269, 294, 296, 264/320, 322; 425/509, 518, 520, 392, 393; 29/512, 513, 462, 525.1

[56] References Cited

U.S. PATENT DOCUMENTS

| | | | |
|---|---|---|---|
| 3,142,868 | 8/1964 | Blount | 264/269 |
| 3,435,109 | 11/1963 | Flaming | 264/296 |
| 3,461,505 | 8/1969 | Schroeder et al. | 425/392 |
| 3,466,707 | 9/1969 | Click et al. | 425/392 |
| 3,509,252 | 4/1970 | Baehr | 264/296 |
| 3,769,393 | 10/1973 | Bjalme | 264/310 |
| 4,018,863 | 4/1977 | Schneiders et al. | 264/269 |
| 4,156,710 | 5/1979 | Carroll et al. | 264/296 |
| 4,383,966 | 5/1983 | Svetlik | 156/286 |
| 4,525,319 | 6/1985 | Kaspe | 264/322 |
| 4,691,740 | 9/1987 | Svetlik et al. | 156/286 |
| 4,818,314 | 4/1989 | Brittain et al. | 264/36 |

Primary Examiner—Jeffery Thurlow
Assistant Examiner—Mathieu Vargot

[57] ABSTRACT

A method for flaring pipe liners. The method includes pushing against the end of a thermoplastic liner installed in a metal pipe with a first forming head and applying heat to cause said head to flare outwardly about an acute angle; and subsequently pushing against said end with a second forming head and applying heat to cause said end to bend into contact with said flange.

3 Claims, 3 Drawing Sheets

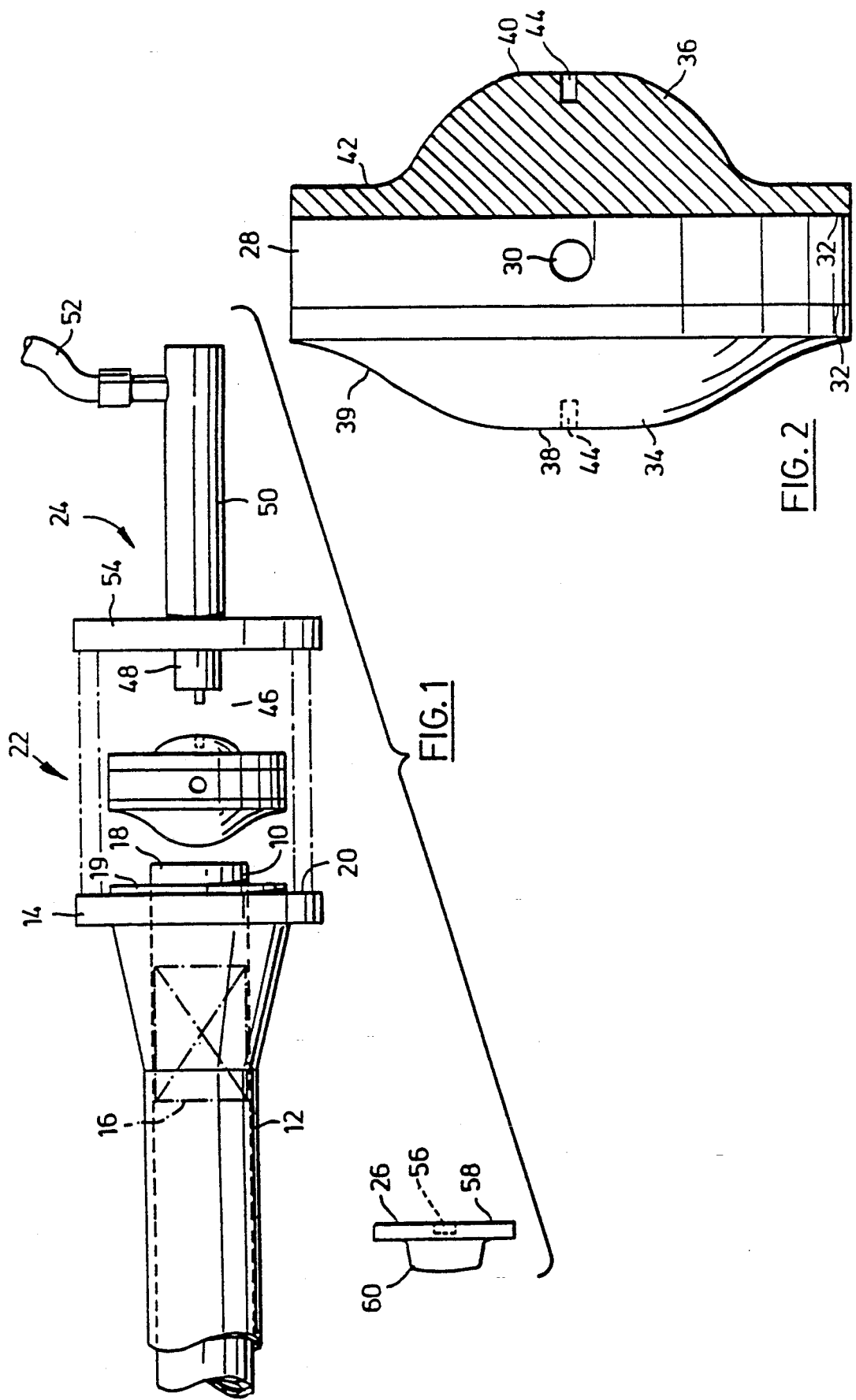

METHOD FOR FLARING PIPE LINERS

This application is a divisional of U.S. patent application, Ser. No. 07/346,829, filed May 2, 1989, now U.S. Pat. No. 4,968,241.

BACKGROUND OF THE INVENTION

This invention relates to a method for flaring an end of a plastic pipe liner installed inside a pipe.

It is known to line metal pipes with plastic liners to rehabilitate them and/or to provide corrosion or chemical resistance. There are many different methods of lining pipe known in the art. Canadian Patent 1,241,262 (Du Pont Canada Inc.) discloses a method and apparatus for lining pipe which involves taking a liner of a larger O.D. than the I.D. of the pipe to be lined, reducing the diameter of the liner with driven rollers and pulling the liner into the pipe. The pulling force is then released and the liner is allowed to expand and fit tightly against the wall of the pipe.

It is known to weld plastic flanges to the ends of the liner after installation so that liner segments may be joined together. However, it is difficult to do this after the liner has been inserted into a pipe.

U.S. Pat. Nos. 4,383,966 (Svetlik) and 4,156,710 (Caroll et al.) both teach the idea of flaring thermoplastic pipe ends to form flanges thereon. However, neither of these patents teach a method of carrying this out on a thermoplastic liner installed inside a pipe.

U.S. Pat. No. 3,341,894 (Flaming) teaches the idea of flaring the end of a liner installed inside a pipe by using a heated plug. It has been found that using a single plug of the design disclosed in this patent causes the end of the liner to curl under itself.

U.S. Pat. No. 4,525,319 (Kaspe) discloses a method and apparatus for forming a flange on a thermoplastic pipe inside a sleeve. The invention employs only a single head to move the end of the liner through an obtuse angle to form a flange. This head may cause the liner to buckle or it may cause the liner to curl under itself, which in either case will create an unsatisfactory flange.

It is desirable to flare the end of the liner after it has been installed in a pipe to form a flared end while inhibiting buckling or curling of the liner under itself.

SUMMARY OF THE INVENTION

Accordingly, the present invention provides a method for flaring the end of a thermoplastic liner installed in a metal pipe, said end extending beyond the pipe and said pipe having at least one flange mounted thereon, said method comprising:

pushing against said end with a first forming head and applying heat to cause said end to flare outwardly about an acute angle; and subsequently pushing against said end with a second forming head and applying heat to cause said end to bend into contact with said flange.

It has been found that the use of the second forming head allows the liner to be bent gradually into contact with the flange so that the liner is inhibited from buckling or curling under itself.

BRIEF DESCRIPTION OF THE DRAWINGS

Preferred embodiments of the invention will be further described, by way of illustration only, with reference to the following drawings, in which:

FIG. 1 is a side view of a partially assembled apparatus for flaring pipe;

FIG. 2 is a side view in partial cross-section of a flaring head assembly for use with the apparatus of FIG. 1;

DESCRIPTION OF THE PREFERRED EMBODIMENTS

Figure 4:
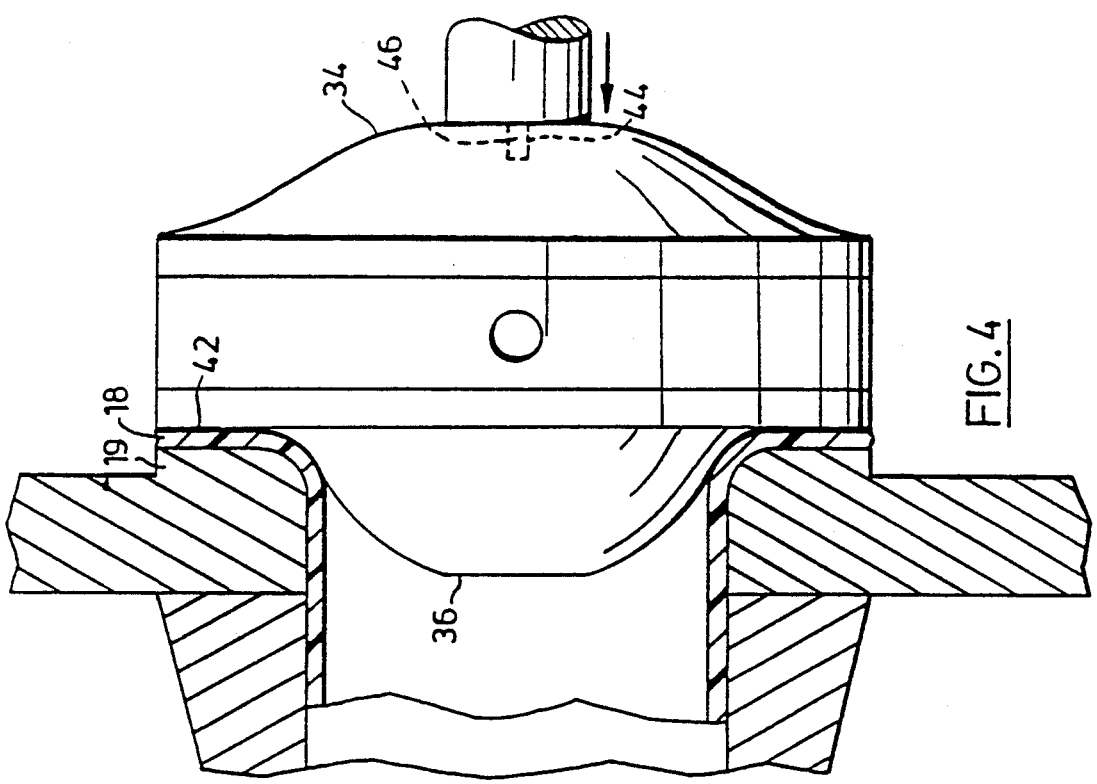
FIG. 4 is a side view in partial cross-section of the apparatus of FIG. 1 during a second flaring stage.

A partially assembled apparatus for flaring a thermoplastic liner 10 installed inside a metal pipe 12 having a flange 14 on its end is illustrated in FIG. 1. The liner 10 is held in position in the pipe by a retractable anchor 16 (indicated in ghost outline), the design of which is known in the art. The end 18 of the liner extends beyond the end of the pipe flange 14 by an amount sufficient to cover the raised face 19 of the flange 14 after flaring. A flaring unit for flaring the end of this liner is generally indicated by the number 22. This flaring unit 22 is pushed against the liner by a hydraulic cylinder assembly 24. A third flaring head 26 also forms part of the apparatus and method as will be discussed later.

Details of the flaring unit 22 may be seen in FIG. 2. This apparatus comprises a heating plate 28 having a handle 30 on the side and a flaring head 34, 36 mounted on each of the circular heat transfer surfaces 32 thereof. A first flaring head 34 has a generally convex external surface 38. The slope of the peripheral portion 39 of this surface is about 30 degrees. A second flaring head 36 also has a generally convex external surface 40. The peripheral portion 42 of this surface is flat. The flaring heads 34, 36 each have a recess 44 at the centre thereof for receiving a projection 46 of the hydraulic cylinder assembly 24 (see FIG. 1).

The projection is located on the end of a hydraulic cylinder 48, as may be seen in FIG. 1. This cylinder 48 is located in a sleeve 50 and the annulus between the cylinder and the sleeve is sealed and filled with hydraulic fluid via an inlet 52. This sleeve 50 is attached to a second flange 54. This second flange 54 is bolted to the pipe flange 14 so that it is coaxial with the pipe 12.

The third flaring head 26 is of the same design as the second flaring head 36 described above except that it has a recess 56 on its rear face 58 instead of on its front face 60.

Figure 3:
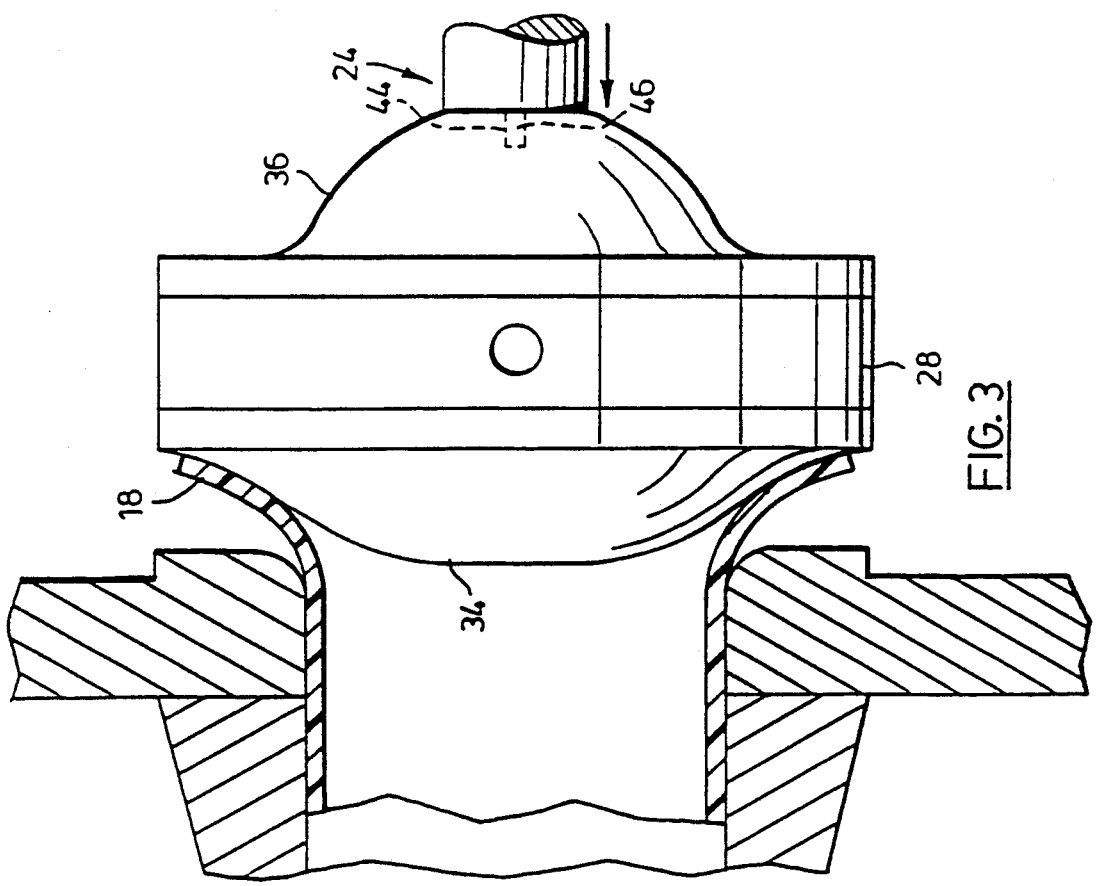
FIG. 3 is a side view in partial cross-section of the apparatus of FIG. 1 during a first flaring stage.
Figure 5:
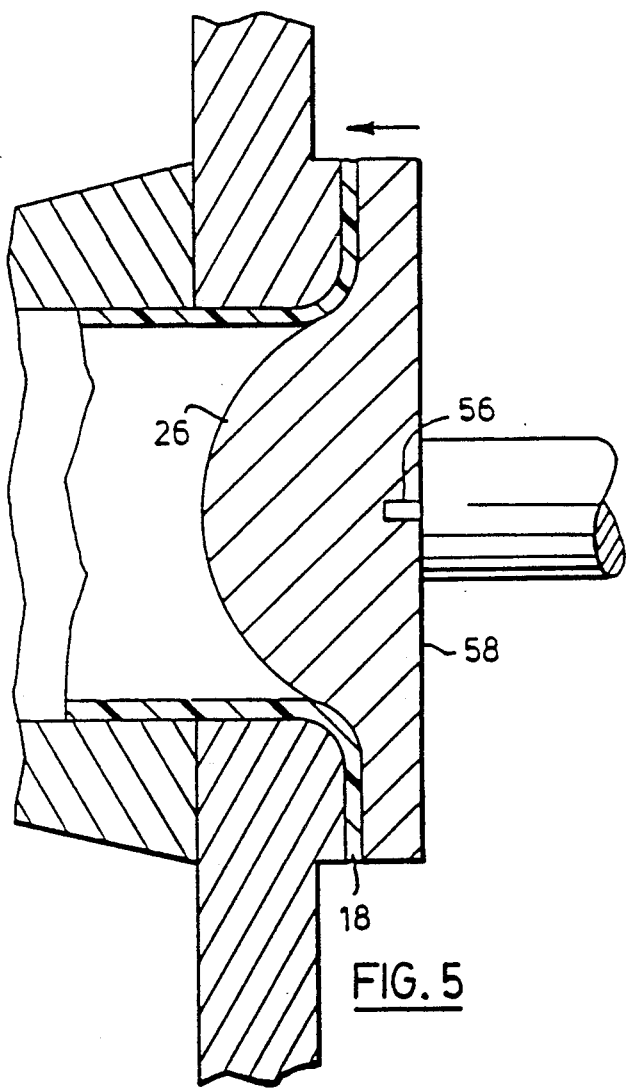
FIG. 5 is a side cross-sectional view of the apparatus of FIG. 1 during a third flaring stage.

The operation of the preferred embodiment of the invention will now be described with reference to FIGS. 3, 4 and 5. As may be seen in FIG. 3, the projection 46 of the hydraulic cylinder assembly 24 is first received in the recess 44 of the second flaring head 36. The heater 28 is then turned on so that the flaring heads 34, 36 are heated to a temperature around the glass transition temperature of the liner material. The first flaring head 34 is then pressed against the liner using the hydraulic cylinder assembly 24 for a sufficient amount of time and at a sufficient pressure so that the peripheral portion 39 contacts and flares the liner end 18. The liner end 18 is thereby flared by about a sixty degree angle. The first flaring head 36 is then removed from the liner and the flaring unit is turned over by turning the handle 30 so that the second flaring head 36 faces the liner. The projection 46 of the hydraulic cylinder assembly is then inserted in the recess 44 of the first flaring head as may be seen in FIG. 4. The second flaring head 36 is then pressed against the partially flared end 18 using the hydraulic cylinder assembly 24. The peripheral flat portion 42 of the head is pressed for a sufficient amount of time and at a sufficient pressure to bend the flared end 18 until it is normal to the rest of the liner and is in contact with the raised face 19 of the flange 14.

The flaring assembly 22 is then removed from the liner and is disengaged from the hydraulic cylinder assembly 24. The third flaring head 26, which has been chilled in a refrigeration unit, is then mounted on the hydraulic cylinder assembly 24 by inserting the projection 46 of the hydraulic cylinder assembly into the recess 56 on the rear face 58 of the head 26. The third flaring head 26 is then pressed against the liner end 18 for a sufficient amount of time to cool the liner while maintaining it in the bent shape.

Figure 6:
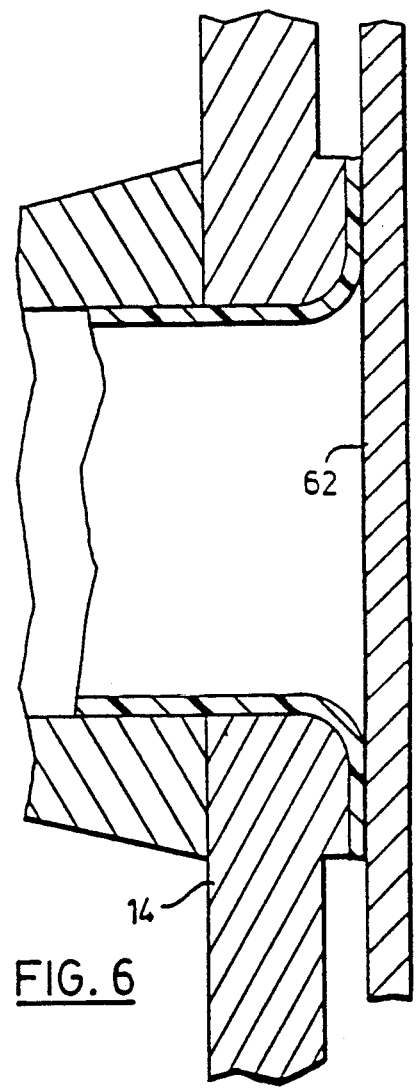
FIG. 6 is a side cross-sectional view of the apparatus of FIG. 1 after the third flaring stage.

The third head is removed after cooling and, as may be seen in FIG. 6, a retaining plate 62 may be bolted to the flange 14 to inhibit the liner end from creeping back to its original unflared position.

Modifications to the preferred embodiment may be made within the scope of the invention as described and claimed. The periphery of the first head may be of any design suitable to flare the end of the liner about an angle in the range of about 30 and 80 degrees and most preferably about an angle of around 60 degrees relative to the rest of the liner.

The second head may be of any design suitable to flare the end of the liner by about an angle of between 90 and 110 degrees and most preferably about an angle of around 90 degrees relative to the rest of the liner.

The preferred embodiment of the present invention provides several advantages. The use of the first two heads allows for gradual forming of the flared end to avoid buckling or curling under the end. Also, the two heads are mounted on opposed heated plates of a heater to form a unit that is easy to use and allows the heads to be quickly and easily interchanged. The cooled head allows the flared end to be cooled quickly while it is maintained in the flared position. The use of a final retaining plate during storage inhibits creep of the liner back to its original unflared position.

I claim:

1. A method for flaring the end of a thermoplastic liner installed in a metal pipe, said end extending beyond the pipe and said pipe having at least one flange mounted thereon, said method comprising:

applying hydraulic pressure to push against said end with a first forming head and applying heat to flare said end outwardly about an acute angle;

then applying hydraulic pressure to push against said end with a second forming head and applying heat to cause said end to bend into contact with said flange; and subsequently applying hydraulic pressure to push against said end with a third forming head, said third forming head being cooled, to cool said end while maintaining it in a flared position, wherein the first and second forming heads being formed on a flaring unit having a first head side and a second head side, the step of pushing against the end with the first forming head is carried out by directly mounting the second head side of the unit onto a pressure application means and then activating said pressure application means; and the step of pushing against the end with the second forming head is carried out by rotating the unit and directly mounting the first head side of the unit onto the pressure application means and then activating said pressure application means.

2. The method of claim 1 further comprising bolting a retaining plate onto said flange to retain said end in a flared position after it has been cooled by said third forming head.

3. The method of claim 1 wherein the flaring unit is mounted on a respective heat exchange surface of a heater and wherein said first and second head sides of the unit each have mounting means located thereon for removably mounting said heads onto the pressure application means.

* * * * *